United States Patent [19]

Gesslein, Jr. et al.

[11] Patent Number: 5,684,867
[45] Date of Patent: Nov. 4, 1997

[54] REMOTE DATA ACCESS FOR OPERATOR ASSISTANCE CALLS

[75] Inventors: John P. Gesslein, Jr., Naperville; Robert Michael Jelinski, Aurora; David Caswell McChristian, Naperville; William Francis Thompson, Aurora, all of Ill.

[73] Assignee: Lucent Technologies Inc., Murray Hill, N.J.

[21] Appl. No.: 420,467

[22] Filed: Apr. 12, 1995

Related U.S. Application Data

[63] Continuation-in-part of Ser. No. 333,812, Nov. 3, 1994.

[51] Int. Cl.$^6$ .............................. H04M 3/42; H04M 7/00; H04M 3/00
[52] U.S. Cl. .......................... 379/115; 379/210; 379/221; 379/230; 379/260
[58] Field of Search ......................... 379/112, 113, 379/114, 115, 111, 143, 144, 207, 219, 379, 220, 222, 223, 126, 127, 196, 201, 230, 260, 261, 262, 263

[56] References Cited

U.S. PATENT DOCUMENTS

| 5,287,403 | 2/1994 | Atkins et al. | 379/112 |
| 5,353,335 | 10/1994 | D'Urso et al. | 379/112 |
| 5,506,893 | 4/1996 | Buscher et al. | 379/114 |
| 5,550,899 | 8/1996 | McLeod et al. | 379/207 |
| 5,555,290 | 9/1996 | McLeod et al. | 379/207 |
| 5,574,780 | 11/1996 | Andruska et al. | 379/230 |
| 5,586,175 | 12/1996 | Hogan et al. | 379/112 |

Primary Examiner—Curtis Kuntz
Assistant Examiner—Binh K. Tieu
Attorney, Agent, or Firm—Werner Ulrich

[57] ABSTRACT

A method and apparatus for serving operator assistance calls from a remote operator assistance system but using the data base of the normal serving operator assistance system to verify the capability of the caller to place the desired call. The call is routed to the remote system where, for example, a specialized operator team, such as a Spanish speaking team, serves calls from an entire region or nation. The remote system accesses the data base of the normal serving system to obtain the data, describing the attributes of the caller, necessary to minimize the number of calls that are fraudulently completed.

7 Claims, 3 Drawing Sheets

REMOTE DATA ACCESS FOR OPERATOR ASSISTANCE CALLS

CROSS-REFERENCE TO RELATED APPLICATION

This application is a continuation-in-part of: John P. Gesslein, Jr. and David Caswell McChristian entitled "Remote Data Access For Operator Assistance Calls", Ser. No. 08/333,812, filed Nov. 3, 1994, an application assigned to the same assignee as the present application.

TECHNICAL FIELD

This invention relates to the processing of operator assistance calls and more particularly to the processing of operator assistance calls wherein remote operator assistance systems are used to serve the calls.

PROBLEM

Operator assistance type calls including calling card calls, collect calls, person to person calls and bill to third party calls have increasingly been automated to minimize and in many cases eliminate the time required for an operator to actually assist on the call. At the same time services have become specialized so that the use of teams of operators having special capabilities becomes desirable. One area in which it is desirable to have operators with special capabilities is to handle calls from callers who prefer to use a language other than English as the total number of operators decreases and as the need for specialized teams increases, it becomes more and more necessary to form special teams for serving all calls of a particular type from a single facility which facility can then be staffed by an appropriate sized team. A problem with this approach is that the extensive and complex checks required to avoid fraud in operator assistance systems especially on toll calls requires the extensive use of local data bases unconnected to a remote operator assistance system. A problem of the prior art therefore is to serve operator assistance calls from a team of operators that is centralized on a regional or national basis without comprising the extensive anti-fraud checks that have been built in to operator assistance systems and are based on local data bases.

This problem also arises when a centralized team of directory assistance operators is used, and the directory assistance system is arranged to complete calls to the number obtained by the directory assistance process. For these calls, it is also important to stop fraudulent calls.

SOLUTION

The above problem is solved and an advance is made over the prior art in accordance with our invention wherein a call serving operator assistance system to which a specialized type of call is routed, queries the data base of the normal serving operator assistance system, i.e., the operator assistance system that normally serves operator assistance calls of the caller; the query obtains data on billing and call handling options available to the caller and screening information for the calling and called number to determine whether the caller may attempt a requested call. The information obtained from the normal serving operator assistance system may include data such as the billing and call handling options available to the caller and screening data to determine whether the caller has a class of service which allows that caller to attempt a call to the called number. Advantageously, all of the fraud prevention capabilities of the normal serving office are thereby made available to the call serving operator assistance system so that the fraud prevention capabilities for the specialized types of calls are equally powerful even though the call is served from a remote operator assistance system.

In accordance with one preferred embodiment of applicants' invention callers throughout the United States are routed to a team of bi-lingual operators by calling the number 1-800-772-6474 (1-800-SPANISH). Calls to this number will receive Spanish language announcements and will be served by Spanish speaking operators. The arrangement can also be used for operator assistance systems that process requests for directory assistance and that offer to complete the calls to a number found by the directory assistance process.

DETAILED DESCRIPTION

Figure 1:
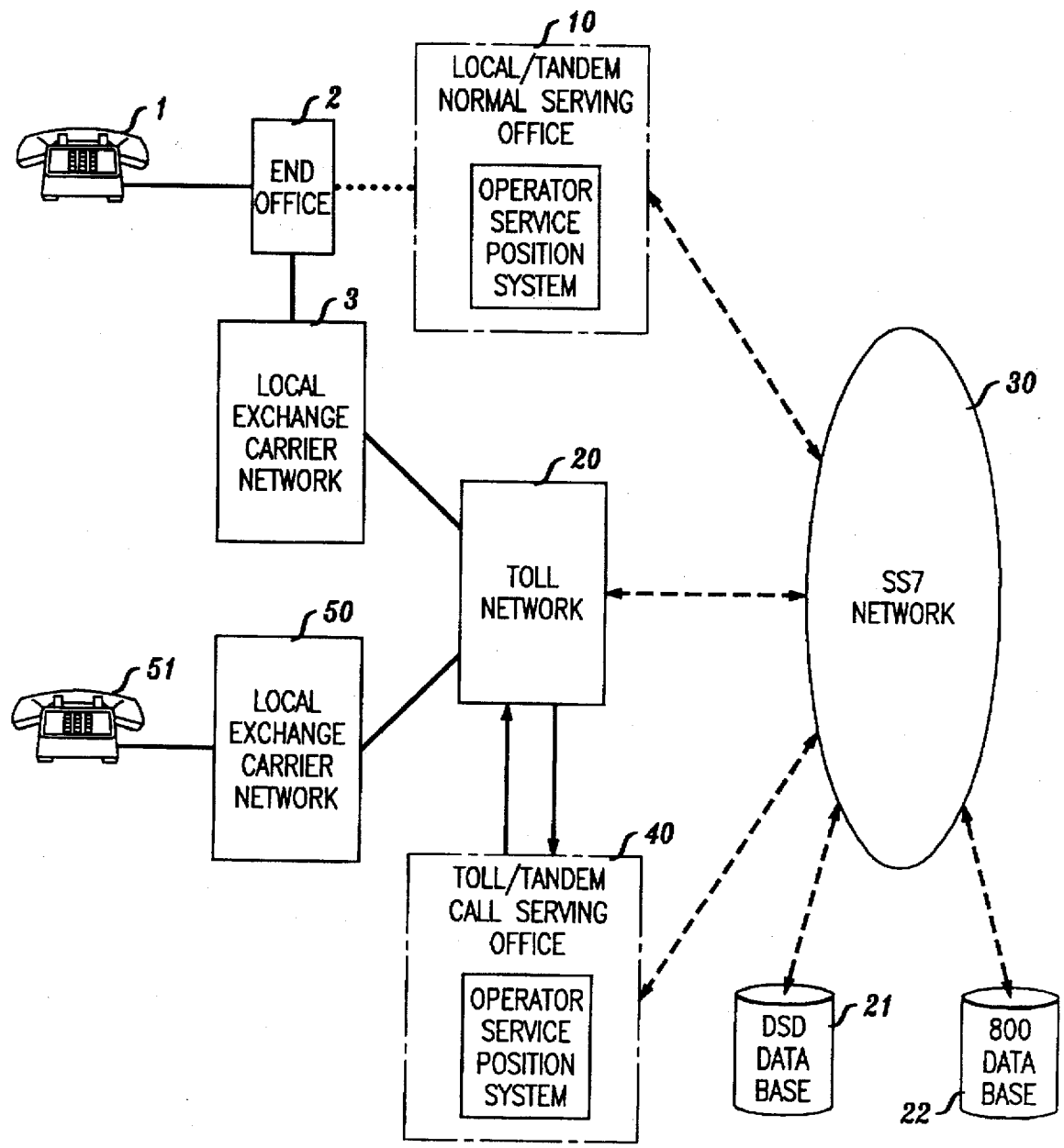
FIG. 1 is a block diagram illustrating call and data paths used to implement applicants invention.

FIG. 1 is a diagram showing the operation of applicants' invention. (Solid lines represent call connections, dashed lines represent data connections and the dotted line represents the call connection path for normal operator assistance calls.) A customer at a telephone station 1 places a call which will be served by a special serving team in Dallas, Tex. by dialing 1-800-SPANISH. The caller is connected to an end office 2. If this were an ordinary operator assistance call, that customer would be served from switch 10 which is a local/tandem switch containing an operator services position system (OSPS) subsystem to which operators are connected. However, this is an 800 call which is routed through the local exchange carrier (LEC) network 3 to a toll network 20. The LEC network determines from the particular 800 number the toll carrier network to which this call is to be routed.

Toll network 20 first queries 800 data base 22 using a Signaling System 7 network 30 to transmit the data messages to that data base. The data base 22 responds with an indication that further data is required from data base 21 and provides a key number for accessing this further data. Toll network 20 then accesses the Direct Signaling Dialing (DSD) data base 21 in order to obtain the final routing information for the call which is provided by that data base. Toll network 20 then routes the call to a toll tandem switch 40 which contains an OSPS for connection to a group of operators. The routing message (not shown) that accompanies the connection between toll network 20 and toll tandem switch 40 is interpreted to route the call to the call serving team (a bilingual team) which is to handle this call. For the purposes of this description, switch 40 which serves the call under discussion, will be referred to as the call serving office whereas switch 10 which would handle normal operator assistance traffic from telephone station 1 is referred to as the normal serving office.

The call serving office communicates with the caller including requesting that the caller dial or provide verbally the directory number of the called telephone 51 and, where appropriate, a calling card number; as will be described further with respect to FIGS. 2 and 3. The call serving office requests information stored in the normal serving office 10 in order to make a sound determination as to whether the requested call can be attempted, i.e., is authorized. If the requested call can be attempted, then the call serving office completes the call via toll network 20 and the local exchange carrier network 50 (which could be the same as local exchange carrier network 3 if the two ends of the call are served by the same local exchange carrier) to telephone 51.

Figure 2:
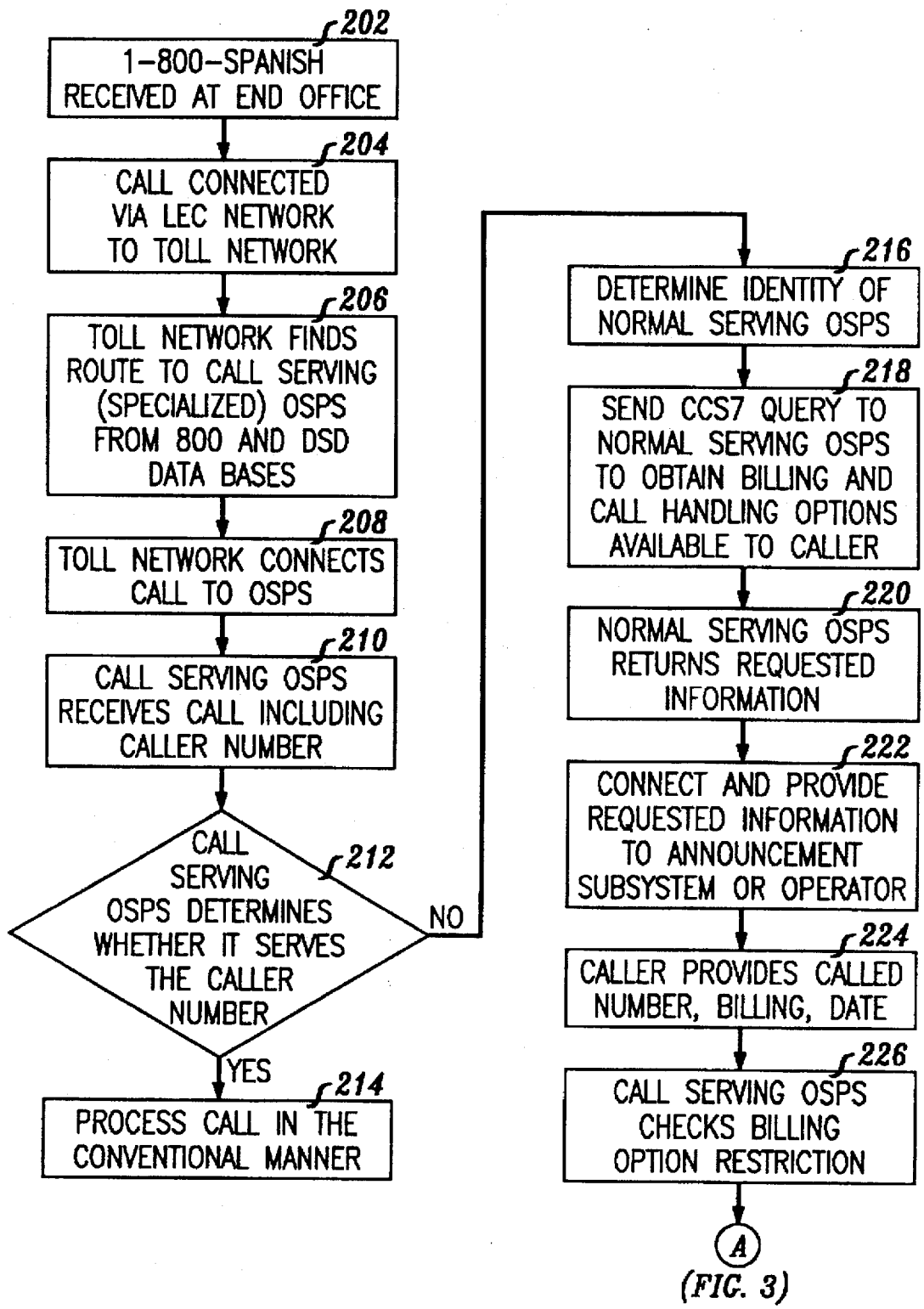
FIGS. 2 and 3 are flow charts of the call processing steps executed in order to implement applicants' invention.
Figure 3:
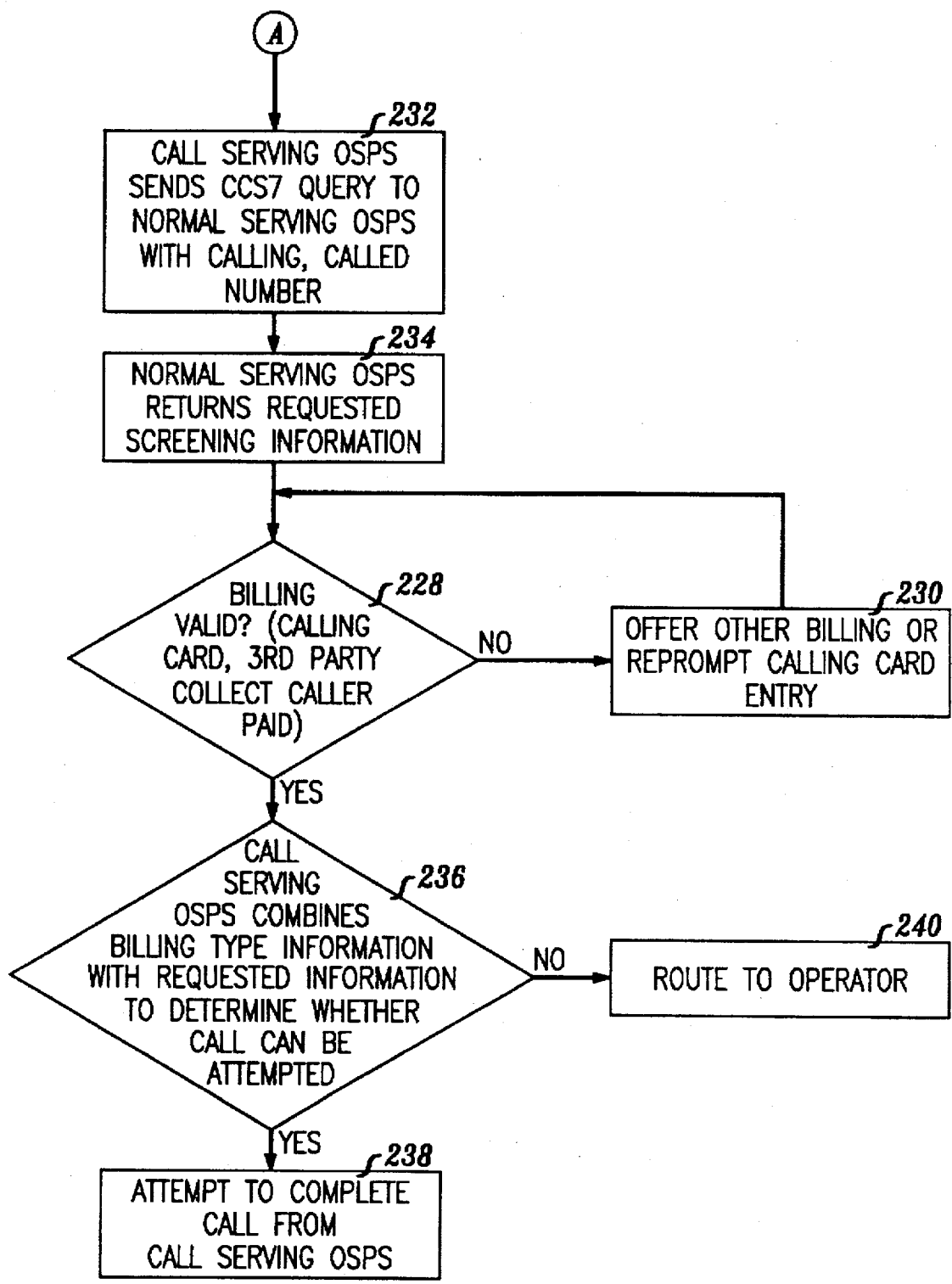

FIGS. 2 and 3 are flow diagrams of the call processing steps required to implement applicants' invention. When the caller dials 1-800-SPANISH the number is received at the end office 2 (action block 202). The end office recognizes that this is an 800 call and the call is connected via the local exchange carrier network 3 to the toll network 20 (action block 204). (In some cases the end office may directly access the toll network.) The 800 number specifies the toll carrier for handling the call in a manner well known in the prior art. The toll network then finds the route to the call serving (specialized) OSPS from the 800 data base and the Direct Signaling Dialing (DSD) data base by querying these data bases (action block 206). The toll network then connects the call to the call serving OSPS (action block 208). The call serving OSPS receives the call, including information identifying the caller, and further information for identifying the call (action block 210). The call serving OSPS then determines whether it is the switch that normally serves the caller number (test 212). If so the call is processed in the conventional way (action block 214) because the call serving OSPS has all the data that it needs for serving a call from that calling number.

In the more general case, wherein the call serving OSPS determines that it does not normally serve the caller number, it determines the identity of the normal serving OSPS (action block 216). Effectively, the call serving OSPS has a list of office codes and the identity of the OSPS serving each office code. The call serving OSPS sends a CCS7 query via SS7 network 30 to the normal serving OSPS to obtain billing and call handling options available to the caller (action block 218). (For example, the data might indicate that the calling station cannot place calling card calls. The data might indicate that the caller cannot place automated calls but must be routed to a staffed operator position. The data might indicate that the caller cannot use a subaccount billing feature. The data might also include a special billing number for the call, to be used instead of the caller's number as originally received.) The normal serving OSPS returns the requested information via the SS7 network 30 (action block 220). The call is then connected to an announcement subsystem or operator and the requested information is provided to the announcement subsystem or operator (action block 222). For the case of language assistance service, the indication of this type of service is used to connect the proper announcement and team to the call. The caller, at the request of the announcement subsystem or operator, provides the called number and billing data such as a request for a calling card call, collect call or third party billing call or person to person call (action block 224).

The choice of an operator or announcement system depends on the service and the type of call. In the initial offering, the 1-800-SPANISH service calls are always connected to an operator. In the future however it is possible that an announcement system and, possibly a speech recognition system, will be used to request the called number and, if applicable, the calling card number; even collect calls may be indicated through signals from the callers or through simple voice commands ("yes", "no", in English or Spanish). In general, when an announcement system is used, arrangements are provided to connect to an operator if the information required to complete the call is not or cannot be provided on a fully automatic basis (for example if the caller has a dial telephone).

The call serving OSPS then sends a second query over the CCS7 network to the normal serving OSPS with the calling and called number (action block 232). The normal serving OSPS returns the requested screening information to determine whether the particular caller can call the particular number (action block 234). An example of a case in which the caller can make certain types of toll calls but not others is the restriction on toll calls currently placed on calls from New York City's Port Authority bus terminal. Calling card calls from that facility are accepted if the destination is within the U.S.; however international calls placed using a calling card from the Port Authority bus terminal are simply rejected on the basis that a large fraction of such calls are likely to use stolen calling cards whose invalidity has not yet been registered.

The call serving OSPS then checks for billing option restrictions based on the class of service data provided in the initial response from the normal serving OSPS. Test 228 then determines whether the billing is valid, i.e., whether the caller can make the selected calling card, bill to third party, collect, or caller paid call. Further if this is a calling card call the validity of the calling card is checked via an SS7 message exchange to a calling card validation data base. For serving hotel room number paid traffic, the normal serving office provides data for transmitting billing information back to the hotel. The call serving office uses Greenwich Mean Time to rate and bill calls which eliminates time zone constraints. If the billing does not appear to be valid, then an operator offers other billing options or if the billing is a calling card then the caller is given a reprompt to attempt to enter the calling card correctly on a second attempt (action block 230).

The call serving OSPS combines the billing type information with the requested information to determine whether the call can be attempted. It is at this point that international calling card calls from the Port Authority bus terminal would be rejected. Rejected calls are routed in general to an operator (action block 240). If the call is not rejected then an attempt is made to complete the call from the call serving OSPS (action block 238).

This arrangement can also be used in conjunction with centralized directory assistance service. This type of service frequently offers the caller the option to complete the call to the number found by the directory assistance process. The arrangement described herein can also be used for verifying the authority of the caller to place a call to the found number.

More generally, wherever a centralized facility is required because of specialized operator skills, specialized internal data bases, specialized service circuits, ability to offer a specialized new service that is not initially widely used, this type of arrangement can be used to process calls more accurately. The access need not be via an 800 number (or 900, 700 or 500 number) but can be based on recognition by one of the offices processing the call, for example, a toll switching system of toll network 20, that the call is to be processed by a call serving office and not the normal serving office. This is done for example, for AT&T's proposed National Directory Assistance wherein a caller who dials 1-900-555-1212 is automatically connected to a specially equipped call serving OSPS.

Another example of calls handled by the call serving office instead of the normal serving office is telephone relay service (TRS) for hearing impaired users. Calls from these users are routed initially to specially equipped switching systems. Operator assistance calls are then routed to a call serving office of a carrier chosen by the caller and having specially trained operators and special relaying equipment.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. A method of establishing an operator assistance call for a caller normally served for operator assistance calls by a normal operator assistance system from a different call serving operator assistance system, comprising the steps of:

receiving a call including a call number of said caller in said different call serving operator assistance system;

receiving a call telephone number in said different call serving operator assistance system;

determining a specific billing type for billing an extension of said call to said called telephone number;

responsive to receipt of said called telephone number, sending a query data message to said normal operator assistance system, said query data message comprising said calling number and said called telephone number, to derive a response data message for screening telephone calls between said calling number and said called telephone number, wherein said response data message comprises data indicating whether a call of a particular billing type is authorized;

responsive to receipt of said response data message, determining in said different call serving operator system whether a connection to extend said call to said called telephone number using said specify billing type for billing said extension is authorized; and in said different call serving operator assistance system, responsive to determining that the extension of said call to said called telephone number is authorized, attempting to extend said connection to said called telephone number.

2. The method of claim 1 wherein said extension of said call is to be charged to a calling card, further comprising the step of;

accessing a calling card validation data base from said different call serving operator assistance system to check whether a calling card number for billing the extension of said call is valid.

3. The method of claim 1 wherein said step of receiving a call comprises the step of receiving said call in response to a caller dialing an 800 number.

4. The method of claim 1 wherein said call is a directory assistance call, and wherein the step of receiving a called telephone number comprises receiving said called telephone number from a directory assistance data base.

5. The method of claim 1 wherein said call received in said different call serving operator assistance system is a call for service by a team of foreign language speaking operators.

6. The method of claim 1 further comprising the steps of:

receiving the call in a toll switching system;

determining in said toll switching system that said call is to be served from said different call serving system; and routing said call to said different call serving system.

7. The method of claim 1 wherein said step of receiving a call comprises the step of receiving said call in response to a caller dialing a number not corresponding to a geographic location of a call destination, further comprising the step of:

accessing a database, shared by a plurality of switching systems to translate the dialed number into a number corresponding to a geographic location of said different call serving operator assistance system.

* * * * *